(12) United States Patent
Chilla et al.

(10) Patent No.: US 7,968,151 B2
(45) Date of Patent: Jun. 28, 2011

(54) PROCESS FOR THE PRODUCTION OF MULTI-LAYER COATINGS

(75) Inventors: Marc Chilla, Sprockhoevel (DE); Michael Georgiadis, Wuppertal (DE); Volker Kegel, Wuppertal (DE); Gunter Richter, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1024 days.

(21) Appl. No.: 10/575,321

(22) PCT Filed: Jul. 8, 2005

(86) PCT No.: PCT/US2005/024387
§ 371 (c)(1),
(2), (4) Date: Apr. 6, 2006

(87) PCT Pub. No.: WO2006/017197
PCT Pub. Date: Feb. 16, 2006

(65) Prior Publication Data
US 2008/0233304 A1    Sep. 25, 2008

Related U.S. Application Data

(63) Continuation-in-part of application No. 10/889,571, filed on Jul. 12, 2004, now abandoned.

(51) Int. Cl.
  *B05D 5/00* (2006.01)
  *B05D 7/16* (2006.01)
  *B05D 1/04* (2006.01)
  *B05D 3/00* (2006.01)

(52) U.S. Cl. .................... 427/409; 427/419.1

(58) Field of Classification Search ............ 427/407.1, 427/409, 419.1
See application file for complete search history.

(56) References Cited

U.S. PATENT DOCUMENTS

| | | | |
|---|---|---|---|
| 2,636,257 A | 4/1953 | Ford | |
| 4,558,090 A | 12/1985 | Drexler et al. | |
| 4,851,460 A | 7/1989 | Stranghoner et al. | |
| 4,914,148 A | 4/1990 | Hille et al. | |
| 4,948,829 A | 8/1990 | Mitsuji et al. | |
| 5,342,882 A | 8/1994 | Gobel et al. | |
| 5,574,166 A | 11/1996 | Winter et al. | |
| 5,709,909 A | 1/1998 | Leibfarth et al. | |
| 5,760,123 A | 6/1998 | Vogt-Birnbrich et al. | |
| 5,968,655 A | 10/1999 | Hartung et al. | |
| 5,976,343 A * | 11/1999 | Schlaak | 205/198 |
| 6,156,379 A | 12/2000 | Terada et al. | |
| 6,331,326 B1 * | 12/2001 | Tsunoda et al. | 427/202 |
| 6,368,719 B1 | 4/2002 | Siever et al. | |
| 6,773,759 B2 | 8/2004 | Kobayashi et al. | |
| 2003/0054193 A1 | 3/2003 | McCollum et al. | |
| 2003/0098238 A1 | 5/2003 | Kulfan et al. | |
| 2004/0028822 A1 * | 2/2004 | Dutt et al. | 427/385.5 |

FOREIGN PATENT DOCUMENTS

| | | |
|---|---|---|
| EP | 0 576 943 A1 | 1/1994 |
| EP | 1 291 090 B1 | 12/2005 |
| WO | WO 94/18278 | 8/1994 |
| WO | WO 97/47401 | 12/1997 |

OTHER PUBLICATIONS

PCT International Search Report and the Written Opinion of the International Searching Authority, Mailed Nov. 14, 2005.

* cited by examiner

*Primary Examiner* — William Phillip Fletcher, III
(74) *Attorney, Agent, or Firm* — Sudhir G. Deshmukh

(57) ABSTRACT

A process for the production of special effect multi-layer coatings, comprising the successive steps: (1) applying a 10 to 30 μm thick base coat layer onto a substrate provided with an EDC primer, (2) applying a clear coat layer onto the base coat layer, (3) jointly curing the base coat and clear coat layers, wherein the base coat layer is applied in a first layer and in a second layer; the first layer comprises a modified water-borne base coat produced by mixing an unmodified water-borne base coat with an admixture component and the second layer comprises the unmodified water-borne base coat, wherein the unmodified water-borne base coat has a ratio by weight of pigment content to resin solids content of 0.05:1 to 0.6:1 and wherein the pigment content of the unmodified water-borne base coat comprises at least one metal flake pigment having a thickness of 10 to 100 nm corresponding to a proportion of 0.1 to 5 wt. %, relative to the resin solids content of the unmodified water-borne base coat and at least one additional special effect pigment and wherein the composition of the pigment content is such that the UV light transmission through the base coat layer formed of the first and second layers is less than 0.1% in the wavelength range of from 290 to 380 nm and less than 0.5% in the wavelength range of from 380 to 400 nm.

9 Claims, No Drawings

PROCESS FOR THE PRODUCTION OF MULTI-LAYER COATINGS

CROSS-REFERENCE TO RELATED APPLICATIIONS

This application is a national stage entry under 35 U.S.C. §371 of PCT/US2005/24387, filed 8 Jul. 2005 and published as WO 2006/017197 A1, which is a continuation-in-part of Ser. No. 10/889,571, filed 12 Jul. 2004, now abandoned.

FIELD OF THE INVENTION

The invention relates to a process for the production of multi-layer coatings in particular special effect color shades.

DESCRIPTION OF THE PRIOR ART

Automotive coatings consist as a rule of a separately baked electrodeposition coating (EDC) primer, a separately baked primer surfacer layer (filler layer) applied thereto and a top coat applied thereto consisting of a wet-on-wet applied color- and/or special effect-imparting base coat layer and a protective, gloss-imparting clear coat layer. The total primer surfacer plus base coat layer thickness is generally 30 to 60 μm, being more particularly in the lower range of 30 to 45 μm for light special effect color shades.

A coating composition is known from U.S. Pat. No. 6,156,379 which contains metal flake pigments made by deposition from the gas phase and is suitable for producing coatings which appear as metal-coated surfaces.

A coating process is known from U.S. Pat. No. 6,331,326 with which coatings may be produced which appear as metal-coated surfaces. The coating process comprises application of a primer and/or a first metallic coat, which contains conventional non-leafing aluminum pigments with flake thicknesses of 0.1 to 1 μm and an average particle size of 1 to 60 μm. A second metallic coat is then applied, which contains small, thin metal flake pigments with flake thicknesses of no more than 0.08 μm and an average particle size of 5 to 40 μm.

Processes are known from WO 97/47401, U.S. Pat. Nos. 5,976,343, 5,709,909 and 5,968,655 for the production of decorative multi-layer coatings, which processes allow the process step of primer surfacer application with separate baking to be dispensed with and coating material consumption and thus the total layer thickness to be reduced. The processes have in common the fact that a multi-layer coating structure comprising a first, modified water-borne base coat, a second, unmodified water-borne base coat and a clear coat is applied by a wet-on-wet-on-wet process (joint curing of the three coating layers) to a baked EDC primer. In practice, the processes using the two base coat layers allow the achievement of total layer thicknesses markedly lower, by approximately 15 to 25 μm, than that of a conventional primer surfacer and base coat. The modified water-borne base coat is produced in these processes from the unmodified water-borne base coat by mixing with an admixture component and is intended to replace the function of a conventional primer surfacer. WO 97/47401 recommends as an admixture component, the addition of polyisocyanate crosslinking agent, while U.S. Pat. No. 5,976,343 describes the addition of polyurethane resin and U.S. Pat. Nos. 5,709,909 and 5,968,655 describe the addition of a filler (extender) paste.

A weakness of the processes disclosed in WO 97/47401, U.S. Pat. Nos. 5,976,343, 5,709,909 and 5,968,655 is that the production of multi-layer coatings, in particular special effect color shades, for example, light special-effect color shades, in particular light metallic color shades, especially silver color shades, is not readily possible. The reason is UV light (UV radiation), as a constituent of natural daylight, passes through the coating layers applied to the EDC primer to the surface of the EDC primer to a noticeable extent in the absence of a primer surfacer layer. Problem color shades are, in particular, water-borne base coats with a pigment content consisting of large quantities of special effect pigment including at least small amounts of metal pigment but no or only small amounts of white, colored and/or black pigment.

From the point of view of the observer, the multi-coating structure appears to be an opaque coating. However, an inadmissibly large amount of UV light may penetrate through the multi-layer structure of clear coat, unmodified water-borne base coat and modified water-borne base coat to the surface of the EDC primer and cause long term damage to the EDC layer. For example, the UV light penetrates through the multi-layer structure to an extent exceeding the specified UV transmission level and reaches the EDC layer; car manufacturers' specifications state, for example, that UV transmission through the base coat layer in the area of the complete outer skin of the vehicle body should amount to less than 0.1% in the wavelength range of from 290 to 380 nm and less than 0.5% in the wavelength range of from 380 to 400 nm. The possible undesired long-term consequences of an inadmissible level of UV light penetration to the EDC layer are chalking of the EDC layer and delamination of the multi-layer coating over the service life of the coated substrates.

If the modified and/or unmodified water-borne base coat were to be applied in a total film thickness sufficient to prevent to an adequate degree the access of UV light to the EDC primer, this would be an unacceptable backward technological step in the direction of high total film thickness.

The use of UV absorbers in clear coats or base coats is known, for example, from U.S. Pat. No. 5,574,166 and WO 94/18278, and is a solution to the problem of delamination. However, UV absorbers cannot be used to a very great extent in the base coat layers and/or the clear coat layer because of the migration tendency of the UV absorbers and because of the gradual degradation of the UV absorbers, as well as for cost reasons.

Other solutions, which approach the delamination problem from the EDC side are known from EP-A-0 576 943, U.S. Pat. No. 6,368,719, US 2003/0054193 A1 and US 2003/0098238 A1. These disclose the use of EDC coating compositions which are resistant to the action of UV light due to specially selected binders or due to the addition of suitable additives. This inevitably restricts the EDC composition, such that concessions may have to be made in relation to other technological properties, such as, for example, corrosion protection.

SUMMARY OF THE INVENTION

Surprisingly, the advantages of the processes according to WO 97/47401, U.S. Pat. Nos. 5,976,343, 5,709,909 and 5,968,655 (omission of primer surfacer application, small total film thickness) may be retained while access of UV light to the EDC primer, which is destructive in the long term, may nonetheless be adequately prevented, if unmodified water-borne base coats containing particular metal pigments are used in the production of multi-layer coatings in the above-described problematic color shades. UV transmission through the base coat layer formed of modified water-borne base coat and unmodified water-borne base coat may then be adjusted to less than 0.1% in the wavelength range of from 290 to 380 nm and to less than 0.5% in the wavelength range of from 380 to 400 nm, whereby, for example, corresponding car manufacturers' specifications may be fulfilled. In particular, it is also surprising that only very small proportions of the relevant metal pigments need to be used.

The invention relates to a process for the production of special effect multi-layer coatings, comprising the successive steps:
(1) applying a 10 to 30 µm thick base coat layer onto a substrate provided with an EDC primer,
(2) applying a clear coat layer onto the base coat layer,
(3) jointly curing the base coat and clear coat layers,
wherein the base coat layer is applied in a first layer and in a second layer; the first layer comprises a modified water-borne base coat produced by mixing an unmodified water-borne base coat with an admixture component and the second layer comprises the unmodified water-borne base coat, wherein the unmodified water-borne base coat has a ratio by weight of pigment content to resin solids content of 0.05:1 to 0.6:1 and wherein the pigment content of the unmodified water-borne base coat comprises at least one metal flake pigment having a thickness of 10 to 100 nm corresponding to a proportion of 0.1 to 5 wt. %, relative to the resin solids content of the unmodified water-borne base coat and at least one additional special effect pigment and wherein the composition of the pigment content is such that the UV light transmission through the base coat layer formed of the first and second layers is less than 0.1% in the wavelength range of from 290 to 380 nm and less than 0.5% in the wavelength range of from 380 to 400 nm.

DETAILED DESCRIPTION OF THE EMBODIMENTS

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The term "pigment content" means the sum of all the pigments contained in a coating composition without fillers (extenders). The term "pigments" is used here as in DIN 55944 and covers, in addition to special effect pigments, inorganic white, colored and black pigments and organic colored and black pigments. At the same time, therefore, DIN 55944 distinguishes between pigments and fillers.

In the process according to the invention, conventional substrates provided with an EDC primer are coated. In particular, the substrates are automotive bodies or body parts provided with an EDC primer, in particular a cathodic electrodeposition (CED) coating. Production of substrates provided with an EDC primer is known to the person skilled in the art. There are no restrictions with regard to the selection of the EDC primer; in particular, EDC primers are also suitable which would be damaged by long-term exposure to UV light.

The substrates having an EDC primer are provided, first of all with a 10 to 30 µm thick base coat layer. The base coat layer is applied in two layers, i.e., a first layer, for example, 5 to 20 µm thick of a modified water-borne base coat produced by mixing an unmodified water-borne base coat with an admixture component is applied and a subsequent second layer, for example, 2 to 10 µm thick of the unmodified water-borne base coat then is applied. The total film thickness of the base coat layer is dependent inter alia on color shade; car manufacturers' requirements for base coat film thickness are expressed in the so-called process film thickness (average film thickness which is desired over the entire body in the automotive original coating process), which is directed towards the film thickness for each base coat color shade required to achieve the desired color shade on the substrate and to achieve technological properties (e.g., resistance to stone impact) and towards an economic application of the relevant water-borne base coat, i.e., in as thin a film as possible. The total base coat film thickness ranges from 10 to 30 µm and is the sum of, for example, 5 to 20 µm of the modified water-borne base coat plus, for example, 2 to 10 µm of the unmodified water-borne base coat. Such film thicknesses for base coats meet the requirements for coating the relevant substrates, for example, automotive bodies. In particular, this means that a specific value within this range from 10 to 30 µm represents the process film thickness for a particular individual water-borne base coat.

The film thicknesses indicated in the present description and in the claims for coating layers refer in each case to dry film thicknesses.

In the description and in the claims, a distinction is drawn between unmodified and modified water-borne base coats.

The unmodified water-borne base coats, from which the modified water-borne base coats may be produced by mixing with an admixture component, as explained in more detail below, are coating compositions having a ratio by weight of pigment content to resin solids content of 0.05:1 to 0.6:1. In addition to water, a resin solids content, which comprises binder(s), optionally, paste resin(s) and optionally, crosslinking agent(s), a pigment content, which comprises special effect pigments together optionally with further pigment(s), optionally, filler(s) and optionally, organic solvent(s) and generally also contain conventional coating additive(s). The pigment content of the unmodified water-borne base coat comprises at least one metal flake pigment having a thickness of 10 to 100 nm in an amount of 0.1 to 5 wt. %, preferably 0.3 to 2 wt. %, relative to the resin solids content of the unmodified water-borne base coat, and at least one further special effect pigment. The composition of the pigment content of the unmodified water-borne base coat is such that UV light can penetrate through a base coat layer formed of modified water-borne base coat and unmodified water-borne base coat only at a UV transmission level of less than 0.1% in the wavelength range of from 290 to 380 nm and of less than 0.5% in the wavelength range of from 380 to 400 nm. In other words, with the ratio by weight of pigment content to resin solids content of 0.05:1 to 0.6:1, the qualitative and quantitative composition of the pigment content comprising at least one metal flake pigment with a thickness of 10 to 100 nm and at least one further special effect pigment is such that UV light can penetrate through a base coat layer formed of modified and unmodified water-borne base coat (as is formed as a sublayer of the multi-layer coating structure, produced by the process according to the invention) only at a UV transmission level of less than 0.1% in the wavelength range of from 290 to 380 nm and less than 0.5% in the wavelength range of from 380 to 400 nm. In the case of a pigment content which is comparable per se but without the content of the at least one metal flake pigment with a thickness of 10 to 100 nm, the UV transmission would be markedly higher, namely in the inadmissible range and not in accordance with the specifications, and it is expected that it would be 0.1% or more in the wavelength range of from 290 to 380 nm and/or 0.5% or more in the wavelength range of from 380 to 400 nm.

UV transmission may be measured by applying a corresponding structure of modified water-borne base coat and unmodified water-borne base coat to a UV light-transmitting support, for example, a silica glass plate, and measuring the UV transmission in the corresponding wavelength range using a corresponding uncoated UV light-transmitting support as reference.

For example, suitable pigment contents consist of 50 to 100 wt. % of special effect pigments and of 0 to 50 wt. % of one or more pigments selected from white, colored and black pigments and especially of 98 to 100 wt. % of special effect pigments and of 0 to 2 wt. % of one or more pigments selected from white, colored and black pigments. In any case, the pigment contents comprise at least one metal flake pigment with a thickness of 10 to 100 nm as a constituent of the group of the special effect pigments, in a proportion of 0.1 to 5 wt. %, preferably 0.3 to 2 wt. %, relative to the resin solids content of the unmodified water-borne base coat, together with at least one further special effect pigment.

The unmodified water-borne base coats contain ionically and/or non-ionically stabilized binder systems. These are preferably anionically and/or non-ionically stabilized. Anionic stabilization is preferably achieved by at least partially neutralized carboxyl groups in the binder, while nonionic stabilization is preferably achieved by lateral or terminal polyethylene oxide units in the binder. The unmodified water-borne base coats may be physically drying or crosslinkable by formation of covalent bonds. The crosslinkable unmodified water-borne base coats forming covalent bonds may be self- or externally crosslinkable systems.

The unmodified water-borne base coats contain one or more conventional film-forming binders. They may optionally also contain crosslinking agents if the binders are not self-crosslinkable or physically drying. Examples of film-forming binders which may be used are conventional polyester, polyurethane, (meth)acrylic copolymer resins and/or hybrid binders derived from these classes of binder. Selection of the optionally contained crosslinking agents depends, in a manner familiar to the person skilled in the art, on the functionality of the binders, i.e., the crosslinking agents are selected in such a way that they exhibit a reactive functionality complementary to the functionality of the binders. Examples of such complementary functionalities between binder and crosslinking agent are: carboxyl/epoxy, hydroxyl/methylol ether and/or methylol (methylol ether and/or methylol preferably as crosslinkable groups of amino resins, in particular melamine resins).

The unmodified water-borne base coats contain extremely small quantities, namely, 0.1 to 5 wt. %, preferably 0.3 to 2 wt. %, of at least one metal flake pigment with a thickness of 10 to 100 nm, relative to the resin solids content. The 10 to 100 nm, preferably 20 to 80 nm thick metal flake pigments are special effect pigments, have an average particle size of, for example, 5 to 30 μm, preferably 10 to 20 μm, and consist in particular of aluminum. They are produced, for example, by vacuum deposition or ultrathin grinding of special aluminum grits. The metal flake pigments may be unpassivated or passivated. Passivated types are, for example, phosphated, chromated or coated with a silicon-oxygen network. Passivated types are preferably used.

Such metal flake pigments are commercially available in both passivated and unpassivated form. Examples of such metal flake pigments are the metal pigments sold under the names Metalure®, Platindollar® and Hydroshine®, in each case by Eckart, Metasheen® by Wolstenholme, Starbrite® by Silberline and Decomet® by Schlenk.

The at least one 10 to 100 nm thick metal flake pigment contained in the unmodified water-borne base coats belongs to the group of the special effect pigments. The unmodified water-borne base coats contain the at least one 10 to 100 nm thick metal flake pigment in combination with one or more additional special effect pigments.

Additional special effect pigments that can be used in combination with the at least one 10 to 100 nm thick metal flake pigment are special effect pigments which differ from the 10 to 100 nm thick metal flake pigments. Examples are conventional pigments imparting to a coating a color and/or lightness flop dependent on angle of observation, such as non-leafing metal pigments, e.g., of aluminum, copper or other metals, with a higher flake thickness than the above-mentioned metal flake pigments, for example, ranging from over 100 to 1000 nm, interference pigments such as, for example, metal oxide-oated metal pigments, e.g., iron oxide-coated aluminum, coated mica such as, for example, titanium dioxide-coated mica, graphite effect-imparting pigments, iron oxide in flake form, liquid crystal pigments, coated aluminum oxide pigments, and coated silicon dioxide pigments.

As already stated, the unmodified water-borne base coats may contain, in addition to the special effect pigments, also one or more pigments selected from white, colored and black pigments.

The white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, and perylene pigments.

The unmodified water-borne base coats may also contain fillers, for example, in proportions of 0 to 30 wt. % relative to the resin solids content. The fillers do not constitute part of the pigment content of the unmodified water-borne base coats. Examples are barium sulfate, kaolin, talcum, silicon dioxide, and layered silicates.

The special effect pigments are generally initially introduced in the form of a conventional commercial aqueous or non-aqueous paste, optionally combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special water-dilutable paste resin. Grinding may be performed in conventional assemblies known to the person skilled in the art. The formulation is then made up with the remaining proportion of the aqueous binder or of the aqueous paste resin.

The unmodified water-borne base coats may contain conventional coating additives in conventional quantities, for example, of 0.1 to 5 wt. %, relative to the solids content thereof. Examples are antifoaming agents, wetting agents, adhesion promoters, catalysts, levelling agents, anticratering agents and thickeners.

The unmodified water-borne base coats may contain conventional solvents, for example, in a proportion of preferably less than 20 wt. %, particularly preferably less than 15 wt. %. These are conventional coating solvents, which may originate, for example, from production of the binders or are added separately. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether; glycols, for example, ethylene glycol and/or propylene glycol, and the di- or trimers thereof; N-alkylpyrrolidone, such as, for example, N-methylpyrrolidone; ketones such as methyl ethyl ketone, acetone, cyclohexanone; aromatic or aliphatic hydrocarbons, for example, toluene, xylene or linear or branched aliphatic C6-C12 hydrocarbons.

The unmodified water-borne base coats have solids contents of, for example, 10 to 40 wt. %, preferably of 15 to 25 wt. %.

The modified water-borne base coats may be produced from the unmodified water-borne base coats by mixing with an admixture component. In practice, this mixing is performed by the user shortly or immediately before application of the modified water-borne base coat. This applies especially if the admixture component is chemically reactive with constituents of the unmodified water-borne base coat. In the case of industrial coating facilities, the unmodified water-borne base coats in each case of a different color shade are each guided in their own circulating line. The admixture component to be added is preferably used in the form of a single general purpose admixture component, the one admixture component likewise being guided in its own circulating line and automatically mixed with the respective unmodified water-borne base coat using mixing technology conventional in industrial coating facilities, for example, a Kenics mixer. When applying water-borne base coat in a color shade program of n color shades, it is therefore not necessary to provide 2n circulating lines (in each case n circulating lines for the different colors of unmodified water-borne base coats and for the different colors of modified water-borne base coats), but rather just n circulating lines for the different colors of unmodified water-borne base coats plus one circulating line for the admixture component.

The admixture component is preferably one which is admixed with a coating composition and imparts primer surfacer properties, i.e., the water-borne base coats modified with the admixture component then acquire typical primer surfacer properties (resistance to stone impact, levelling of the substrate). Admixture components suitable for such modification of water-borne base coats are known from WO 97/47401, U.S. Pat. Nos. 5,976,343, 5,709,909 and 5,968,655. These patent documents describe processes for the production of decorative multi-layer coatings in which a coating structure produced by the wet-on-wet-on-wet process and consisting of a modified water-borne base coat, a subsequently applied unmodified water-borne base coat and a finally applied clear coat is applied to a baked EDC primer. In these processes, the initially applied modified water-borne base coat is produced from the subsequently applied unmodified water-borne base coat by mixing with an admixture component and replaces the function of a conventional primer surfacer. While WO 97/47401 recommends the addition of polyisocyanate crosslinking agent, U.S. Pat. No. 5,976,343 describes the addition of polyurethane resin and U.S. Pat. Nos. 5,709,909 and 5,968,655 describe the addition of a filler paste.

The process according to the invention preferably uses one of the admixture components known from WO 97/47401, U.S. Pat. Nos. 5,976,343, 5,709,909 or 5,968,655, i.e., there are three preferred variants for the production of the modified water-borne base coats from the unmodified water-borne base coats: the addition of polyisocyanate to the unmodified water-borne base coat, the addition of polyurethane resin to the unmodified water-borne base coat and the addition of a filler paste to the unmodified water-borne base coat.

In the case of the first preferred variant, the addition of polyisocyanate to the unmodified water-borne base coat, the procedure is such that the unmodified water-borne base coat is mixed with a polyisocyanate admixture component in a ratio by weight of, for example, 1:1 to 5:1, in each case relative to the resin solids content. The resin solids content of the polyisocyanate admixture component is formed by the polyisocyanate itself.

The first preferred variant for the production of modified water-borne base coats is preferably used, if unmodified water-borne base coats, which exhibit a resin solids content comprising one or more hydroxy-functional binders, are used as a starting material. If the hydroxyl value of the resin solids content of the unmodified water-borne base coat is, for example, in the range of from 10 to 180 mg KOH/g, the NCO/OH molar ratio in the modified water-borne base coat is, for example, 1:1 to 25:1. However, in the case of unmodified water-borne base coats with a low-hydroxyl or hydroxyl-free resin solids content, higher NCO/OH molar ratios may also arise in the corresponding modified water-borne base coats. For example, the NCO/OH molar ratios may even extend towards infinity. In such cases, the polyisocyanate in the modified water-borne base coat is consumed by reaction with other constituents which are reactive in relation to isocyanate groups, for example, with water, hydroxy-functional solvents and/or with functional groups of binders which are reactive relative to isocyanate and are different from hydroxyl groups.

Polyisocyanates which may be added individually or in combination to the unmodified water-borne base coats are di- and/or polyisocyanates with aliphatically, cycloaliphatically, araliphatically or less preferably aromatically attached isocyanate groups, which are liquid at room temperature or are present as an organic solution and at 23° C. generally exhibit a viscosity of 0.5 to 2000 mPa·s, preferably, above 1 and below 1000 mPa·s, particularly preferably below 200 mPa·s. Examples of suitable diisocyanates are hexamethylene diisocyanate, tetramethylxylylene diisocyanate, isophorone diisocyanate, dicyclohexylmethane diisocyanate, and cyclohexane diisocyanate.

Examples of polyisocyanates are those which contain heteroatoms in the residue linking the isocyanate groups. Examples of these are polyisocyanates which contain carbodiimide groups, allophanate groups, isocyanurate groups, uretidione groups, urethane groups, acylated urea groups or biuret groups. The polyisocyanates preferably have an isocyanate functionality higher than 2, such as, for example, polyisocyanates of the uretidione or isocyanurate type produced by di- or trimerization of the above-mentioned diisocyanates. Further examples are polyisocyanates produced by reaction of the above-mentioned diisocyanates with water and containing biuret groups or polyisocyanates produced by reaction with polyols and containing urethane groups.

Of particular suitability are, for example, "coating polyisocyanates" based on hexamethylene diisocyanate, isophorone diisocyanate or dicyclohexylmethane diisocyanate. "Coating polyisocyanates" based on these diisocyanates should be taken to mean the per se known biuret, urethane, uretidione and/or isocyanurate group-containing derivatives of these diisocyanates.

The polyisocyanates may be used in blocked form, though this is not preferred. They may be blocked with conventional blocking agents, for example, with alcohols, oximes, amines and/or CH-acidic compounds.

The blocked or preferably free polyisocyanates may be used as such or as a preparation containing water and/or organic solvent. It may be desirable, for example, for the polyisocyanates to be prediluted with a water-miscible organic solvent or solvent mixture. In this case, it is preferable to use solvents which are inert relative to isocyanate groups, especially where the preferred free polyisocyanates are used. Examples are solvents which do not contain any active hydrogen, for example, ethers, such as, for example, diethylene glycol diethyl ether, dipropylene glycol dimethyl ether, glycol ether esters, such as ethylene glycol monobutyl ether acetate, diethylene glycol monobutyl ether acetate, methoxypropyl acetate or N-methylpyrrolidone.

Also suitable are hydrophilic polyisocyanates, which are stabilized in the aqueous phase by a sufficient number of ionic groups and/or by terminal or lateral polyether chains. Water-dispersible polyisocyanates are sold as commercial products, for example, by Bayer under the name Bayhydur®.

In the case of the second preferred variant, the addition of polyurethane resin to the unmodified water-borne base coat, the unmodified water-borne base coat is mixed with polyurethane resin in a ratio by weight of, for example, 2:1 to 10:1, in each case relative to the resin solids content.

Particularly suitable polyurethane resins are the polyurethane resins known to the person skilled in the art as water-borne base coat binders, in particular in the form of aqueous polyurethane resin dispersions.

Examples are polyurethane resins produced by chain extension of isocyanate-functional prepolymers with polyamine and/or polyol and aqueous dispersions containing them. They are described, for example, in U.S. Pat. No. 4,558,090, 4,851,460 and 4,914,148.

Further examples are polyurethane dispersions, which may be produced by chain extension of isocyanate-functional prepolymers with water, as described, for example, in U.S. Pat. No. 4,948,829 and 5,342,882.

Polyurethane dispersions based on polyurethane resins chain-extended by means of siloxane bridges may also be used. These are known from U.S. Pat. No. 5,760,123, for example.

In the case of the third preferred variant, the addition of a filler paste to the unmodified water-borne base coat, the unmodified water-borne base coat is mixed with a filler paste in a ratio by weight of, for example, 2:1 to 5:1, in each case relative to solids content. The filler pastes are preparations which, in addition to filler(s) and a resin solids content comprising binder or paste resin, contain water and/or organic solvent and optionally conventional additives. The filler pastes have solids contents of, for example, 30 to 60 wt. % with a filler/resin solids content ratio by weight of, for example, 0.5:1 to 1.5:1.

Examples of fillers usable in the filler pastes are barium sulfate, kaolin, silicon dioxide and in particular talcum.

The same resins as in the unmodified water-borne base coat itself may in particular be used as binders or paste resins in the filler pastes. Examples of suitable resins have already been mentioned above in the description of the constituents of the unmodified water-borne base coat.

In the process according to the invention, the EDC-primed substrates are initially spray-coated with the modified water-borne base coat in a dry film thickness of, for example, 5 to 20 µm. This is preferably performed using electrostatically-assisted high-speed rotary atomization.

Then, preferably after a brief flash-off phase of, for example, 30 seconds to 5 minutes at an air temperature of 20 to 25° C., the corresponding unmodified water-borne base coat is spray-applied in a dry film thickness of, for example, 2 to 10 µm. This spray application is preferably pneumatic spray application.

This is preferably also followed by a brief flash-off phase of, for example, 30 seconds to 10 minutes at an air temperature of 20 to 100° C., after which the clear coat is applied in a dry film thickness of, for example, 20 to 60 µm.

All known clear coats are in principle suitable as the clear coat. Usable clear coats are here both solvent-containing one-component (1 pack) or two-component (2 pack) clear coats, water-dilutable 1 pack or 2 pack clear coats, powder clear coats or aqueous powder clear coat slurries.

After an optional flash-off phase, the applied water-borne base coat layer consisting of modified and unmodified water-borne base coat and the clear coat layer are jointly cured, for example, by baking, for example, at 80 to 160° C. object temperature.

Using the process according to the invention, EDC-primed substrates may be provided with a special effect coating in light color shades, such as, for example, silver color shades. Destructive access of UV light through the clear coat and base coat layer to the EDC primer may be prevented, although the base coat layer is only 10 to 30 µm thick; application and baking of a primer surfacer layer is not necessary.

The following Examples illustrate the invention. All parts and percentages are on a weight basis unless otherwise indicated.

EXAMPLES

Example 1

Comparison 100 parts by weight of a silver-colored (unmodified) water-borne base coat of the following composition:

12.1 parts of resin solids content (5.8 parts of a polyester polyurethane resin plus 6.3 parts of a polyester acrylate resin; hydroxyl value of the resin solids content 39.5 mg of KOH/g), 3.0 parts of non-leafing aluminum pigment with a flake thickness of 275 nm and an average particle size of 20 µm, 1.5 parts of talcum, 1.0 parts of HALS (hindered amine light stabilizer)-based free radical scavenger, 0.5 parts of UV absorber, 0.2 parts of dimethylethanolamine, 0.5 parts of defoamer, 0.6 parts of polyacrylic acid thickener, 1.2 parts of polypropylene glycol 400, 15 parts of organic solvent (8 parts of butylglycol, 1 part of N-methylpyrrolidone, 3.3 parts of n-butanol, 2.7 parts of n-propanol), 62.9 parts of water were modified by mixing with 10 parts by weight of a 70 wt. % solution of a polyisocyanate crosslinking agent (based on hexamethylene diisocyanate, NCO value 22) in N-methylpyrrolidone and applied to a silica glass plate in a 15 µm dry film thickness by means of electrostatic high-speed rotary atomization.

After 2 minutes flashing off at room temperature, the unmodified (polyisocyanate-free) silver-colored water-borne base coat was pneumatically spray-applied in a 5 µm dry film thickness, flashed off for 5 minutes at 70° C. and baked for 15 minutes at 140° C.

Then, the UV transmission of the silica glass plate coated in this way with a silver-colored water-borne base coat layer of modified and unmodified water-borne base coat was photometrically determined (uncoated silica glass plate in reference beam path; UV irradiation from the coated side).

In the range of from 290 to 380 nm the UV transmission was between 0 and 0.6%, while in the range between 380 and 400 nm it was 0.6 to 0.7%.

Example 2

According to the Invention

Example 1 was repeated with the sole difference that the unmodified silver-colored water-borne base coat contained only 2.9 parts, instead of 3.0 parts, of the non-leafing aluminum pigment and 0.1 parts of a thin aluminum flake pigment (Hydroshine® WS1001 made by Eckart; the 0.1 parts refer to the aluminum flake pigment contained in the product Hydroshine® WS1001).

The UV transmission was between 0 and 0.09% in the range of from 290 to 380 nm and from 0.09 to 0.15% in the range of from 380 to 400 nm.

A comparison of the measurement results from Comparative Example 1 and Example 2 according to the invention clearly shows that the small addition of only 0.1 parts of Hydroshine® WS1001 instead of 0.1 parts of the non-leafing aluminum pigment effects a notable reduction in UV transmission.

What is claimed is:

1. A process for the production of special effect multi-layer coatings consisting essentially of the successive steps:
    (1) applying a 10 to 30 μm thick base coat layer onto a substrate provided with an EDC primer,
    (2) applying a clear coat layer onto the base coat layer, and
    (3) jointly curing the base coat and clear coat layers to produce said special effect multi-layer coatings;
    wherein the base coat layer is applied in a first and second layer,
    wherein the first layer comprises a modified water-borne base coat produced by mixing an unmodified water-borne base coat with an admixture component and the second layer comprises the unmodified water-borne base coat,
    wherein the unmodified water-borne base coat has a ratio by weight of pigment content to resin solids content of 0.05:1 to 0.6:1,
    wherein the pigment content of the unmodified water-borne base coat comprises 0.1 to 2 wt. %, relative to the resin solids content of the unmodified water-borne base coat, of at least one metal flake pigment having a thickness of 10 to 80 nm and at least one additional special effect pigment, and
    wherein the composition of the pigment content is such that UV light transmission through the base coat layer formed of the modified water-borne base coat and unmodified water-borne base coat is less than 0.1 % in the wavelength range of from 290 to 380 nm and less than 0.5 % in the wavelength range of from 380 to 400 nm.

2. The process of claim 1, wherein the unmodified water-borne base coat contains 0.3 to 2 wt. %, relative to the resin solids content of the unmodified water-borne base coat, of metal flake pigment having a thickness of 10 to 80 nm.

3. The process of claim 1 or 2, wherein the film thickness of the first base coat layer of the modified water-borne base coat is 5 to 20 μm and the film thickness of the second base coat layer of the unmodified waterborne base coat is 2 to 10 μm.

4. The process of claim 1, wherein the pigment content consists of 50 to 9.9 wt. % of special effect pigments and of 0 to 50 wt. % of at least one pigment selected from the group consisting of white, colored and black pigments.

5. The process of claim 1, wherein the pigment content consists of 98 to 99.9 wt. % of special effect pigments and of 0 to 2 wt. % of at least one pigment selected from the group consisting of white, colored and black pigments.

6. The process of claim 1, wherein the modified water-borne base coat is applied by electrostatically-assisted high-speed rotary atomization and the unmodified water-borne base coat is pneumatically spray-applied.

7. The process of claim 1, wherein the admixture component imparts primer surfacer properties.

8. The process of claim 1, wherein the admixture component is selected from the group consisting of polyisocyanate crosslinking agents, polyurethane resins and filler pastes.

9. The process of claim 1, wherein the substrate is selected from the group consisting of automotive bodies and body parts.

* * * * *